US005862746A

United States Patent [19]

Bielfeldt

[11] Patent Number: 5,862,746

[45] Date of Patent: Jan. 26, 1999

[54] APPARATUS FOR REDUCING THE WATER CONTENT OF WATER-CONTAINING BROWN COAL

[75] Inventor: Friedrich Bielfeldt, Eppingen, Germany

[73] Assignee: Maschinenfabrik J. Dieffenbacher GmbH & Co., Eppingen, Germany

[21] Appl. No.: 792,979

[22] Filed: Feb. 3, 1997

[30] Foreign Application Priority Data

Feb. 20, 1996 [DE] Germany ........................ 196 06 238.1

[51] Int. Cl.[6] .............................. B30B 9/04; F26B 21/06; C01L 9/08

[52] U.S. Cl. .................................... 100/73; 34/70; 34/73; 34/145; 34/398; 44/626; 100/92; 100/106; 100/118; 100/125; 100/306; 100/316

[58] Field of Search ................................ 100/71–75, 90, 100/92, 104, 106, 125, 118–120, 151–154, 305–307, 316, 101, 102; 34/398, 426, 468–470, 70, 73, 145; 44/608, 626

[56] References Cited

U.S. PATENT DOCUMENTS

| | | | |
|---|---|---|---|
| 772,472 | 10/1904 | Neill | 100/73 |
| 1,535,769 | 4/1925 | Gallardo | 100/73 |
| 1,702,085 | 2/1929 | Kerr | 100/75 |
| 2,139,542 | 12/1938 | Finlayson et al. | 100/125 |
| 2,331,126 | 10/1943 | Loomis | 100/106 |
| 2,647,285 | 8/1953 | Pfau | 100/73 |
| 3,828,444 | 8/1974 | Kopp | 100/73 |
| 4,514,912 | 5/1985 | Janusch et al. | 44/626 |
| 4,571,300 | 2/1986 | Schraufnagel | 44/626 |
| 5,094,012 | 3/1992 | Rosenstock et al. | 34/73 |
| 5,195,428 | 3/1993 | Gawlitta et al. | 100/73 |

FOREIGN PATENT DOCUMENTS

| | | |
|---|---|---|
| 96/10064 | 4/1996 | WIPO . |

OTHER PUBLICATIONS

Fohl, Jaroslav et. al., Entfernen von Wasser aus der Braunkohl, *Braunkohle 39*, 1987, Heft. 3, pp. 46–57.

Fohl, Jaroslav et. al., Entfernen von Wasser aus der Braunkohl, *Braunkohle 39*, 1987, Heft. 4, pp. 78–87.

*Primary Examiner*—Stephen F. Gerrity
*Attorney, Agent, or Firm*—Frohwitter

[57] ABSTRACT

Apparatus for reducing the water content of water-containing, granular brown coal under the action of thermal energy and pressure on the material (14) distributed flat in bed form using a press (9, 10) in which the brown coal is subjected to a mechanically applied initial surface pressure and which is furnished with orifices (21) for feeding steam (HD) which, supplying thermal energy to the brown coal, heats this, with condensation, and the hot water (HW) contained in the heated brown coal is expressed for use as a waste-heat source, a vessel (30) being provided for collecting the hot water (HW), from which vessel the hot water (HW) is passed to the orifices (21) in the press (9, 10), and which vessel is furnished with an inlet for the steam (HD) for expelling the hot water (HW).

14 Claims, 3 Drawing Sheets

APPARATUS FOR REDUCING THE WATER CONTENT OF WATER-CONTAINING BROWN COAL

BACKGROUND OF THE INVENTION

The invention relates to an apparatus for reducing the water content of water-containing, granular brown coal under the action of thermal energy and pressure on the material distributed in bed form. An apparatus of this type and the process carried out using it are described in patent application PCT/EP95/03814. The process comprises the features that a) the brown coal is subjected to a mechanically applied initial surface pressure which is below the maximum surface pressure occurring in the process and at which thermal energy is supplied to the brown coal by steam which heats the brown coal, with condensation, b) and then, without further supply of steam, the surface pressure is increased to at least 2.0 MPa to such an extent that the water present in the heated brown coal is expressed or squeezed out, c) the brown coal being preheated by waste heat, prior to the supply of steam, and the waste-heat source used being hot water expressed from the brown coal from an earlier pass in the process.

The considerable engineering and energetic advantages produced in this process are described in the said patent application in which, in addition, the fundamental form of two apparatuses for carrying out the above-described process is dealt with, that is to say a double-belt press for receiving brown coal distributed flat in bed form, and a platen press which has a press ram and press base and which receives the brown coal distributed flat in bed form.

The journal “Braunkohle 39 (1987) issue 4, pages 78 to 87” describes another process for dewatering brown coal, the so-called “Fleißner process”, in which brown coal is thermally dewatered by introducing superheated steam into the brown coal contained in an autoclave in a pressurized atmosphere of approximately 3.0 MPa.

The brown coal heated by this means, after emptying the autoclave, is transferred to a dry coal bunker, where the thermally dewatered brown coal is cooled by post-ventilation and thus post-dried. In conjunction with this process, during emptying of the autoclave, hot water contained therein is conducted away separately as waste water and fed to an adjacent autoclave to heat the cold brown coal contained therein.

SUMMARY OF THE INVENTION

The object underlying the present invention is to arrange the apparatus in such a manner that the hot water expressed or squeezed out from the brown coal and used as a waste-heat source is utilizable in a favourable manner in conjunction with a press for receiving the brown coal distributed flat in bed form. According to the invention this takes place using a press in which the brown coal is subjected to a mechanically applied initial surface pressure and which is furnished with orifices for feeding steam which, supplying thermal energy to the brown coal, heats this, with condensation, and the hot water contained in the heated brown coal is expressed for use as a waste-heat source, a vessel being provided for collecting the hot water, from which vessel the hot water is passed to the orifices in the press, and which is furnished with an inlet for the steam for expelling the hot water.

By using the press in combination with the vessel for collecting the hot water expressed from the brown coal, this hot water is made utilizable in a favourable manner as a waste-heat source, since the hot water is passed from the vessel to the orifices in the press, where it is then, under the steam pressure, forced through the brown coal distributed in bed form, for which purpose the steam is fed to the vessel via an inlet.

An expedient arrangement of the press is produced if this is constructed as a double-belt press and the intake area is furnished with a multiplicity of feed lances for feeding the steam and the hot water expressed from the brown coal, the hot water feed lances ending upstream of the steam feed lances. By means of the feed lances, both the steam and the hot water utilized as a waste-heat source may be introduced in a uniform distribution into the brown coal, more precisely in such a manner that, firstly, the feed lances for the hot water introduce this into the brown coal and subsequently the comparatively longer feed lances introduce the steam. This means that the brown coal is initially preheated by the hot water, utilizing its function as a waste-heat source.

For taking off the expressed water, through-holes are expediently provided in the lower conveyor belt. The through-holes are expediently arranged in such a manner that, downstream of the feed lances, there is first arranged a through-hole for cold water and subsequently a through-hole for hot water. At the former through-hole, cold water is then collected, since the hot water preheating the coal, by releasing its energy, is cooled down to the coal temperature. After the coal is further heated by the condensing steam, in the course of the pressing phase, the condensate and the coal water exits hot from the unit and is then passed out through the subsequent through-hole and fed back to the hot water lances.

Another advantageous possible arrangement for the press is given if it is constructed as a platen press having a press ram and press base and having steam-tight lateral pressure chamber walls, which platen press receives the brown coal distributed in bed form, at least the press ram being furnished with orifices for feeding hot water and steam and at least the press base being furnished with outlets for taking off the water expressed from the brown coal. The arrangement as a platen press permits a particularly uniform throughput of the hot water and the steam at definable pressures, since the platen press having a press ram and press base is substantially sealed off from the outside and thus the conditions in the platen press may be readily controlled by these.

In order to achieve the most uniform distribution possible of the hot water or the steam over the brown coal bed contained in the platen press, the orifices in the press ram for feeding the steam are distributed so closely together over the press ram that hot water exiting from the press ram and subsequent steam are distributed uniformly over the brown coal bed. In this manner, the hot water initially preheating the brown coal bed and then the subsequent steam are forced to flow through the brown coal bed with a substantially uniform flow front, so that the brown coal bed is uniformly heated over its entire surface.

In order in this process to distribute, especially, the influent hot water uniformly over the surface of the brown coal bed, the pressing side of the press ram and the press base are expediently furnished with a narrow-mesh screen, as a result of which the screen through-holes produced divide hot water, which passes through the press ram, and subsequent steam in such a manner that the hot water, flowing through the screen through-holes, and the steam are divided into fine jets in the manner of a shower. This avoids the hot water fed under pressure taking the form of relatively large jets, which in this case could divide the brown coal bed into channels in an uncontrolled manner, which would destroy the uniformity of the heating.

In order to utilize the energy content of the water exiting from the brown coal expediently, this water is passed to two outlets, of which one serves to carry away cold water and the other serves to transfer hot water to a vessel which is connected to the orifices in the press ram. The water exiting from the brown coal is initially cold water in the starting area of the process sequence which, with the increasing heating of the brown coal by the steam supply, continuously converts into hot water which is then utilized as a waste-heat source. The collection of the water exiting from the coal is divided in the apparatus according to the invention by means of two outlets, that is to say in such a manner that cold water, which cannot form a waste-heat source, is conducted away, whereas the hot water is transferred via a 2nd outlet into the vessel on which the steam acts. Under the steam pressure, the hot water is then to a certain extent forced out of the vessel and fed to the press.

Expediently, a temperature sensor is arranged upstream of the outlets, which temperature sensor controls the two outlets in such a manner that the cold water flows to one outlet and the hot water flows to the other outlet. If the sensor signals the presence of cold water, it permits this to flow off via an outlet. How-ever, if the temperature of the water increases above a defined value (hot water), the temperature sensor reverses the outlets in such a manner that the hot water then flows to the other outlet, from where it then flows to the vessel.

A control means, in particular a pump, is advantageously assigned to the hot water outlet which enables a pressure to be generated in the hot water feed line to the vessel such that the hot water is prevented from boiling in the feed to the vessel, as a result of which the temperature would immediately fall in this area. The hot water is thus kept at a pressure of approximately 2–3 bar, which corresponds to a mean boiling water temperature of approximately 130° C., which is then advantageously available for heating the brown coal at this level.

The outlets are expediently controlled using a 3-way valve, to the inlet of which flows the water expressed from the brown coal. The two other outlets then form the cold water outlet and the hot water outlet.

Upstream of the intake of the 3-way valve is advantageously connected a pressure-control valve which ensures that the expressed water has to overcome a certain resistance, as a result of which a pressure builds up during the expression of the water, e.g. 2–3 bar. On account of this pressure, the uniformity of the flow, in particular the duration of the action of hot water on the brown coal, can be controlled in a favourable manner. In addition, this enables the above-mentioned mean boiling water temperature of approximately 130° C. to be maintained.

BRIEF DESCRIPTION OF THE DRAWINGS

The figures show working examples of the invention. In the drawings

DETAILED DESCRIPTION OF THE INVENTION

Figure 1:
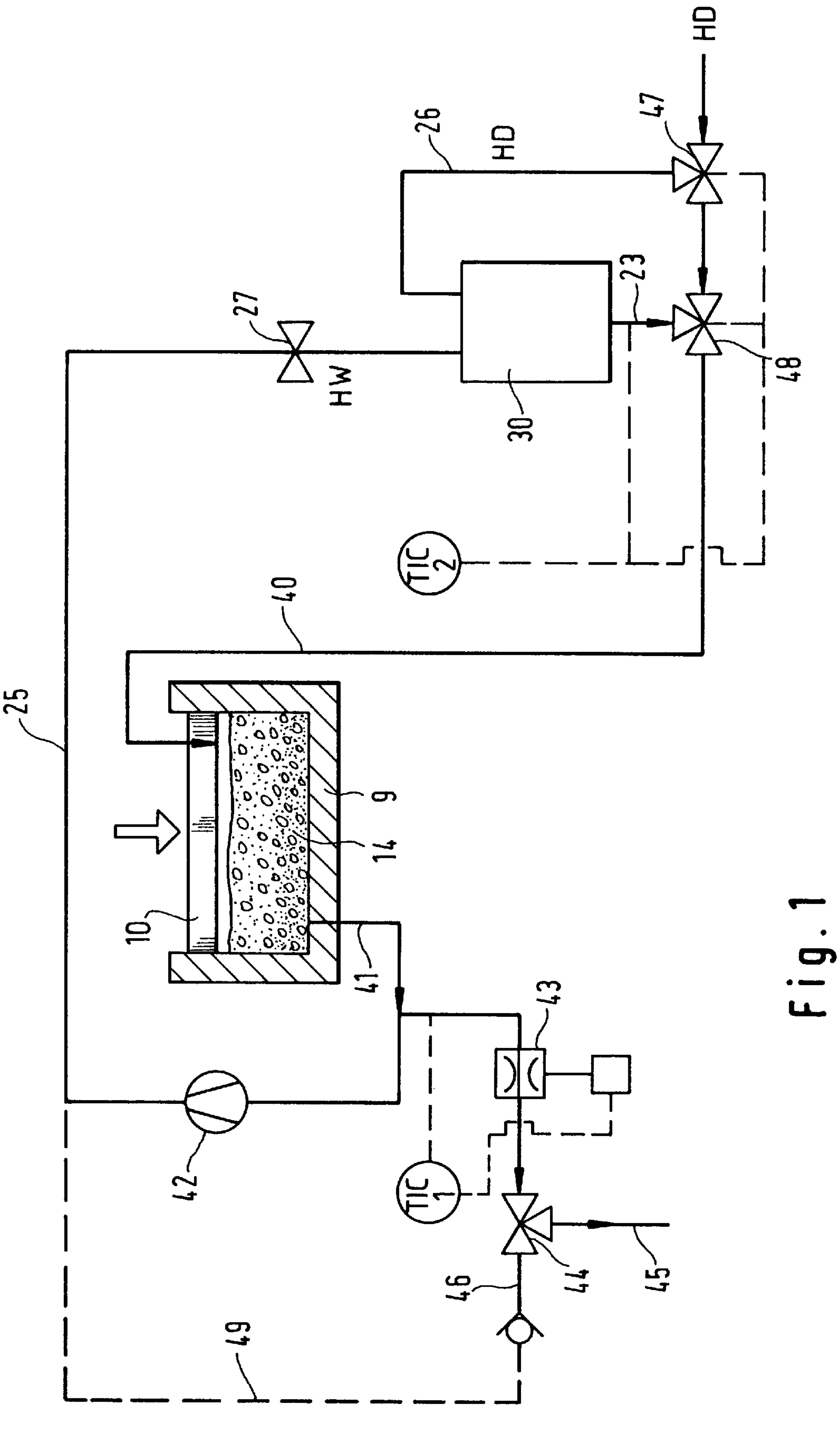
FIG. 1 shows a schematic diagram of the apparatus with a platen press as a basis.

FIG. 1 shows a block diagram of the entire apparatus based on a platen press having a press ram 10 and press base 9. Hot water or superheated steam is fed to this platen press via the feed line 40 and the water expressed or squeezed out by the platen press from the brown coal bed 14 situated therein is conducted away via the outlet line. Before further components belonging to the apparatus are considered in more detail, the platen press and its mode of action may first be described in more detail on the basis of FIGS. 2 and 3.

Figure 2:
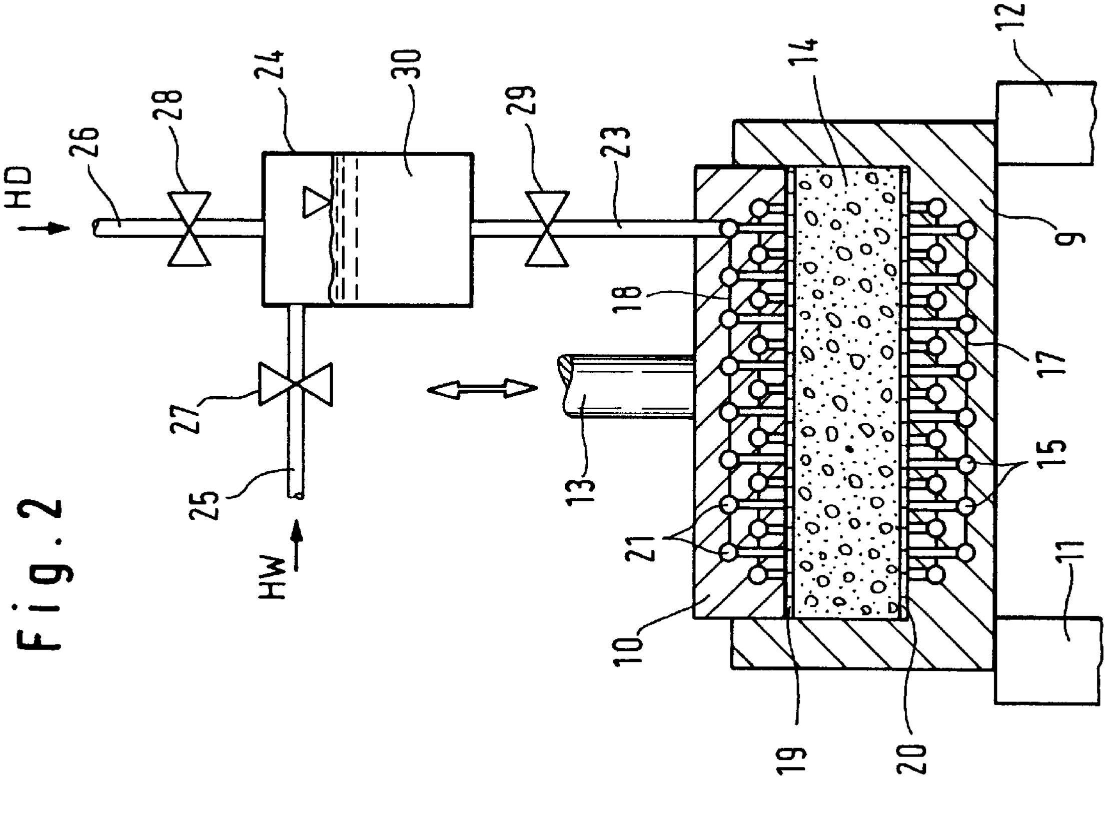
FIG. 2 shows the platen press exerting the initial surface pressure.

FIG. 2 shows a platen press having the press base 9 and the press ram 10. The press base 9 rests on supports 11 and 12 shown here only in outline. The press ram 10 is attached to the slide 13, which is raised and lowered by a press mechanism not shown here. The design of this platen press is in principle prior art.

The press base 9 is here constructed in a trough shape, so that the brown coal 14 can be introduced into it in a flat bed-form distribution. The press base 9 is furnished with water outlets 15 and the press ram 10 is furnished with feed orifices 21, so that, in the case of a closed platen press shown in FIG. 2, hot water HW and steam HD can be fed to the brown coal 14 via the feed orifices 21 and water exiting can be conducted away via the water outlets 15. The water outlets 15 are connected via the channels 17 shown as thin lines in the press base 9 to a collecting outlet, which is not shown, via which the expressed water can flow away.

The hot water HW and the steam HD are fed via the feed orifices 21, which are connected together by the channels 18 indicated as thin lines in the press ram 10. Hot water HW and steam HD are fed to the system of the channels 18 and the feed orifices 21 via the attached feed line 23, which leads to the vessel 24. Hot water HW is fed to the vessel 24 via the feed line 25 and steam HD is fed to the vessel 24 via the feed line 26, the valves 27 and 28 ensuring that the feed of hot water HW and superheated steam HD proceeds in the correct rhythm, the required amount and the correct sequence. The valve 29, by which the feed of superheated water HW and hot steam HD can be shut off, is inserted into feed line 23.

According to FIG. 2, the platen press is in a state in which the press ram 10 subjects the brown coal bed 14 to an initial surface pressure, with, as can be seen, the platen press having its press ram 10 and its press base 9 being just closed. In this operating phase, the valve 29 is opened, which then allows hot water HW, which had been introduced into the vessel 24 in advance, to flow out, and feeds it via the system of the channels 18 to the feed orifices 21. During this, a pressure exerted by the steam HD acts on the hot water HW indicated by the wavy line 30 in the vessel 24, which pressure continues into the vessel 24 via the feed line 26 when the valve 28 is open. Under the pressure of the steam HD, the hot water HW is fed uniformly to the brown coal bed 14 from the vessel 24 via the feed line 23 and the feed orifices 21 and forced through the brown coal, the hot water running off via the outlets 15. This forcing through of the hot water proceeds until the store of water in the vessel 24 is exhausted, whereupon immediately thereafter the steam HD then flows through the brown coal and heats this in the desired manner by condensation. At the end of this operating phase, that is at a sufficient temperature level of the brown coal, further feed of steam is blocked by a valve 29, whereupon the surface pressure in the platen press is increased to at least 2.0 MPa.

Figure 3:
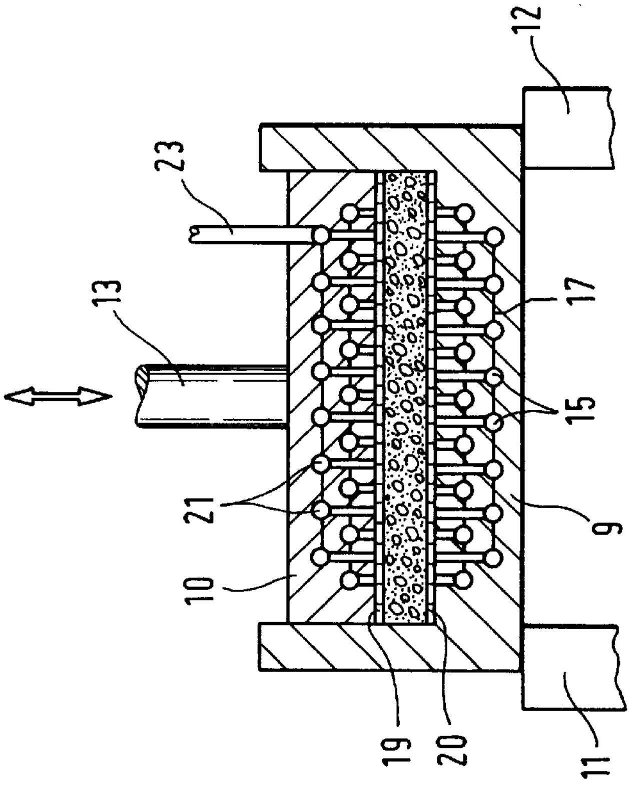
FIG. 3 shows the platen press in the operating position during expression of the water contained in the heated brown coal.

This operating phase is shown in FIG. 3, in which the press ram 10 has fallen further with respect to its position shown in FIG. 1, expressing the water contained in the brown coal, with compression of the brown coal bed 14. The expressed water which has a temperature corresponding to the heated coal bed 14 is then utilized in the above-mentioned manner as a waste-heat source and is fed as hot water to the vessel 24 via the feed line 25.

The process of dewatering the brown coal bed 14 is thus completed, so that the brown coal can be removed from the subsequently opened platen press.

The apparatus together with its components provided overall may now be described with reference to FIG. 1.

During the operating phase described in conjunction with FIG. 2, in which phase the brown coal bed 14 is subjected to an initial surface pressure, hot water HW is fed to the brown coal bed 14 via the feed line 40 from the vessel 30, which hot water flows uniformly flat through the coal bed line 14 and heats this in the context of a preheating. The hot water exiting in the course of this via the outlet line 41 is, as long as the sensor TIC1 indicates a temperature which does not fall below, for example, 130° C., fed via the pump 42, which is switched on by the sensor, to the feed line 25 which leads to the vessel 30 via the valve 27. However, if the TIC1 determines that the temperature has fallen below its threshold, that is, for example, 130° C., it switches the pump 42 off and feeds what is thus determined to be cold water via the pressure-control valve 43 to the 3-way valve 44 which conducts away the cold water via its outlet 45. The further outlet 46 is considered in more detail below.

When the platen press assumes the position shown in FIG. 3, owing to further descent of its press ram 10, expression of the water situated in the heated coal bed 14 then takes place, which water in turn exits as hot water HW via the outlet line 41 and is passed on in the manner described above.

The vessel 30 receives on the one hand the above-mentioned hot water HW via the feed line 25, and in addition superheated steam HD via the 3-way valve 47 which is introduced into the vessel 30 via the feed line 26. The 3-way valve 47 in this case assumes the task of the valve 28 shown in FIG. 2. The superheated steam HD forces the hot water situated in the vessel 30 out from this, namely via line 23, the temperature of the hot water exiting via the line 23 being measured by the temperature sensor TIC2. As long as this temperature sensor measures the influx of hot water into the line 23, it permits superheated steam HD to flow into the vessel 30 via the 3-way valve 47 in the manner described above and the hot water fed via the line 23 to flow into line 40 via the 3-way valve 48, so that the hot water, as mentioned above, enters the press ram 10.

When the hot water HW situated in the vessel 30 has been completely forced out of the vessel 30 by the steam HD, the temperature sensor TIC2 then determines an appropriate temperature level at the line 23 at which it switches over the two 3-way valves 47 and 48 in such a manner that the steam then flows through the 3-way valve 47 in the direction towards the 3-way valve 48 and is fed from this directly to the feed line 40. The steam HD then assumes in the platen press its function described above of heating the brown coal bed 14.

In FIG. 1, as an alternative, a path is shown for the hot water conducted away at outlet line 41, which path proceeds via line 49. When the presence of hot water in line 41 is detected by the temperature sensor TIC1, the 3-way valve 44 is switched to allow passage to line 49, so that the hot water passes directly to line 25. In order that no pressure drop, and thus a falling temperature, can occur during this in outlet line 41, the pressure-control valve 42 already mentioned above is provided upstream of the 3-way valve 44, which pressure-control valve ensures the maintenance of a minimum pressure in the outlet line 41, e.g. 2–3 bar.

Instead of the platen press, having the press ram 10 and the press base 9, depicted in FIG. 1, the double-belt press shown in FIG. 4 can also be used, which may be described below.

Figure 4:
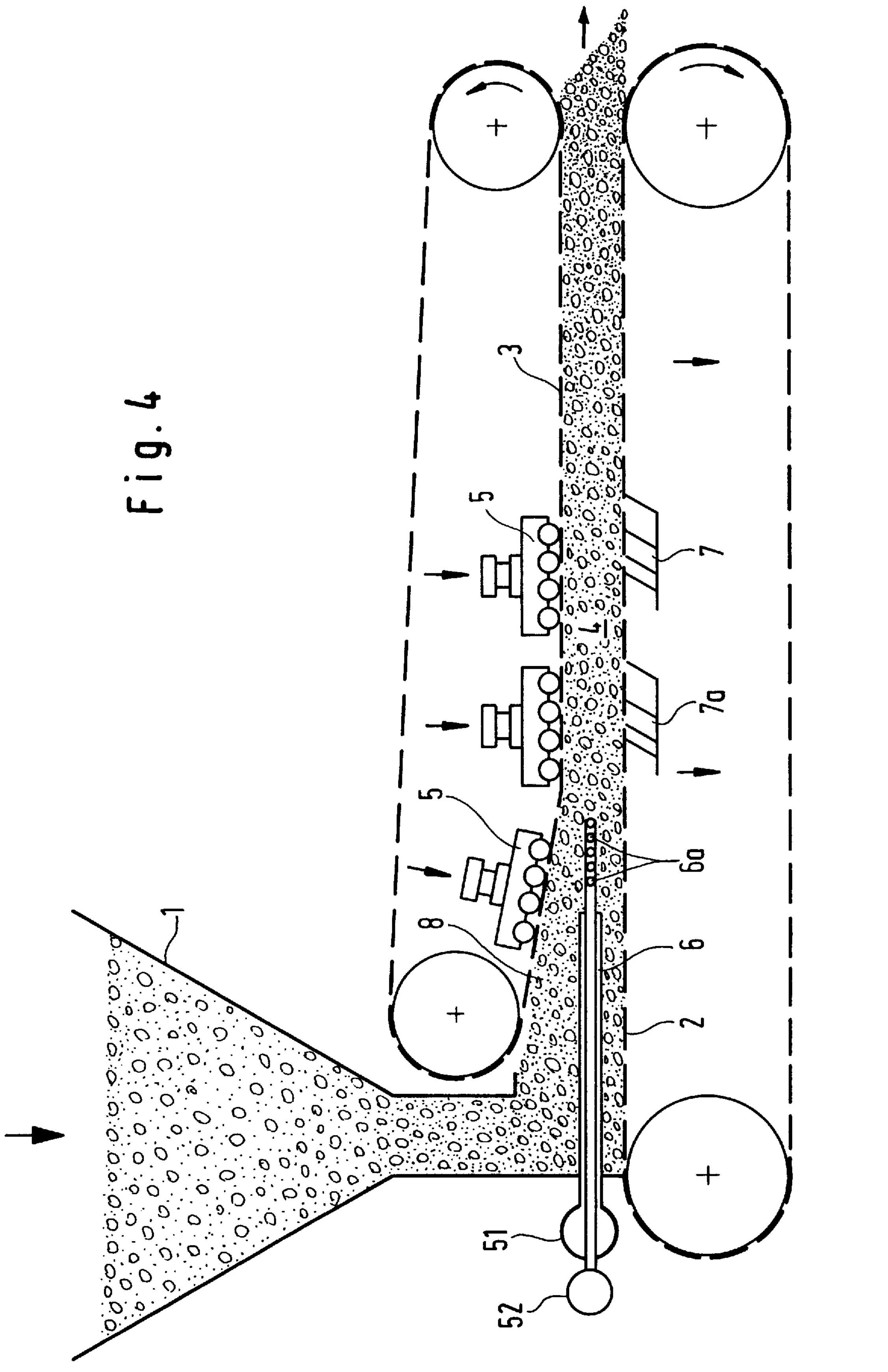
FIG. 4 shows the apparatus with a double-belt press as a basis.

FIG. 4 shows the brown coal bunker 1, which contains brown coal which has been precrushed to a defined particle size. Steam feed lines or hot water feed lines or heat exchange surfaces, which enable preheating of the coal, can be built into the coal bunker 1. The precrushed brown coal is distributed from the coal bunker 1 in bed form onto the lower conveyor belt 2, shown in dashed lines, which transports the coal in the direction of the arrow. Above the conveyor belt 2 of the double-belt press shown, an upper conveyor belt 3 (pressing belt), which is likewise shown in dashed lines, moves forward in the direction of the arrow, the speed of which belt virtually matches that of the conveyor belt 2. The distance between conveyor belt 2 and conveyor belt 3 decreases in the running direction in the intake area 8 thus enables the pressure to be increased on the coal bed 4. The conveyor belt 3, depending on the throughput rate and water content of the brown coal, is height-adjustable over its entire course via load-transmitting press elements 5. Between conveyor belt 2 and conveyor belt 3 there are arranged a multiplicity of steam feed lances 6 and 6*a* which penetrate into the moving coal bed 4, which is shown as dots, the outlet orifices of which steam feed lances end at a point in the intake area 8 in which the pressure on the coal is below the maximum surface pressure in the course of the conveyor belts 2 and 3. The steam exiting from the steam feed lances 6 and 6*a* gives off its heat to the coal and condenses in the course of this. A relatively uniform heating of the coal bed 4 is ensured by the multiplicity of the feed lances 6 of different lengths and arranged at different heights. Hot water HW is fed via the feed lances 6 and steam is fed via the feed lances 6*a*, the feed lances 6 for the hot water HW therefore ending upstream of the feed lances 6*a* for the steam HD. The shared feed of hot water HW and steam HD according to FIG. 1 via the feed line 40 is performed, in the case of the double-belt press according to FIG. 4, via the separate feeds 51 and 52, the feed 51 feeding the hot water HW to the feed lances 6 and the feed 52 feeding the steam HD to the feed lances 6*a*. In the context of FIG. 1, this means that the outlet of the 3-way valve 48 according to FIG. 1 either feeds hot water HW to the feed 51 or connects steam HD directly to the feed 52. The double-belt press according to FIG. 4 thus replaces the platen press shown in FIG. 1.

The parameters pressure and temperature can be set via the height-adjustable conveyor belt 3 and via the steam pressure and the temperature of the heating steam supplied according to throughput rate, particle size and water content of the brown coal. In the course of the first process section (intake area 8), the coal bed 4 is pressure-loaded from above via the conveyor belt 3 by continuously increasing mechanically impressed forces and is preheated by the hot water HW. After a maximum area loading, which is to be specified, has been reached, the consolidated coal bed 4 enters the subsequent process section in which the pressure exerted by the upper conveyor belt 3 is kept constant or varied only slightly. The action of pressure, in combination with the elevated temperature, means that free and released water can be expressed from the coal bed 4 and can be taken off in one or more stages via through-holes 7 on conveyor belt 2 and, optionally, additionally on conveyor belt 3. The hot water exiting from the through-holes 7 and 7*a*, or a part-stream of this water, is used to preheat the brown coal. The cold water exiting beforehand in the process is conducted away via the through-hole 7*a*.

What is claimed is:

1. Apparatus for reducing the water content of water-containing, granular brown coal under the action of thermal energy and pressure on the material (14) distributed flat in bed form using a press (9, 10) in which the brown coal is subjected to a mechanically applied initial surface pressure and which is furnished with orifices (21) for feeding steam (HD) which, supplying thermal energy to the brown coal, heats this, with condensation, and the hot water (HW) contained in the heated brown coal is expressed for use as a waste-heat source, a vessel (30) being provided for collecting the hot water (HW), from which vessel the hot water (HW) is passed to the orifices (21) in the press (9, 10), and which vessel is furnished with an inlet for the steam (HD) for expelling the hot water (HW).

2. Apparatus according to claim 1, characterized in that the press is constructed as a continuously operating double-belt press (2, 3) and its intake area (8) is furnished with a multiplicity of feed lances (6, 6*a*) for feeding the steam (HD) and the hot water (HW) expressed from the brown coal (4), the hot water (HW) feed lances (6) ending upstream of the steam (HD) feed lances (6*a*).

3. Apparatus according to claim 2, characterized in that at least the lower conveyor belt (2) is furnished with through-holes (7, 7*a*) for taking off the expressed water.

4. Apparatus according to claim 3, characterized in that downstream of the feed lances (6, 6*a*) there is first arranged a through-hole (7*a*) for cold water and subsequently a through-hole (7) as an outlet for hot water (HW), which is connected to the hot water lances (6*a*).

5. Apparatus according to claim 1, characterized in that the press is constructed as a platen press having a press ram (10) and press base (9) and having steam-tight lateral pressure chamber walls, which platen press receives the brown coal (14) distributed in bed form, at least the press ram (10) being furnished with orifices (21) for feeding hot water (HW) and steam (HD) and at least the press base (9) being furnished with outlets (15) for taking off the water expressed from the brown coal (14).

6. Apparatus according to claim 5, characterized in that the orifices (21) in the press ram (10) for feeding the steam (HD) are distributed so closely together over the press ram (10) that hot water (HW) exiting from the press ram (10) and subsequent steam (HD) are distributed uniformly over the brown coal bed (14).

7. Apparatus according to claim 5 or 6, characterized in that the pressing side of the press ram (10) and press base (9) are furnished with a narrow-mesh screen (19, 20) and the screen through-holes divide hot water (HW), passing through the press ram (10), and subsequent steam (HD) in such a manner that the hot water (HW), passing through the screen through-holes, or the steam (HD) is divided into fine jets in the manner of a shower.

8. Apparatus according to claim 5, characterized in that the water exiting from the brown coal (14) is passed to two outlets, of which one (45) serves to carry away cold water and the other (46) serves to transfer hot water (HW) to the vessel (30) which is connected to the orifices (21) in the press ram (10).

9. Apparatus according to claim 8, characterized in that a temperature sensor (TIC1) is provided upstream of the outlets (45, 46), which temperature sensor controls the two outlets (45, 46) in such a manner that the cold water flows to one outlet (45) and the hot water (HW) flows to the other outlet (46).

10. Apparatus according to claim 8 or 9, characterized in that a control means, is assigned to the hot water outlet.

11. Apparatus according to claim 10, wherein said control means is a pump (42).

12. Apparatus according to one of claims 8 or 9 characterized in that the outlets (45, 46) belong to a 3-way valve (44), to the inlet of which flows the water expressed from the brown coal (14).

13. Apparatus according to claim 12, characterized in that a pressure-control valve (43) is connected upstream of the intake of the 3-way valve (44).

14. Apparatus according to claim 1, characterized in that a temperature sensor (TIC2) is provided at the outlet of the vessel (30), which temperature sensor controls the inlet to the vessel (30) and the connection from the vessel (30) to the press ram (10) in such a manner that the hot water (HW) stored from the preceding press cycle in the vessel (30) is fed back by steam pressure in the subsequent press cycle to the coal bed (14).

* * * * *